US006853683B2

(12) United States Patent
Song et al.

(10) Patent No.: US 6,853,683 B2
(45) Date of Patent: Feb. 8, 2005

(54) REGULARIZED DEQUANTIZER FOR DCT-BASED TRANSFORM CODING

(75) Inventors: Samuel Moon-Ho Song, Seoul (KR); Gunho Lee, Seoul (KR)

(73) Assignee: Openvisual Inc., Seoul (KR)

( * ) Notice: Subject to any disclaimer, the term of this patent is extended or adjusted under 35 U.S.C. 154(b) by 234 days.

(21) Appl. No.: 09/812,330

(22) Filed: Mar. 19, 2001

(65) Prior Publication Data

US 2002/0106027 A1 Aug. 8, 2002

(51) Int. Cl.[7] .............................................. H04N 7/12
(52) U.S. Cl. ........................... 375/240.25; 375/240.03; 375/240.22
(58) Field of Search ..................... 375/240.02, 240.03, 375/240.12, 240.22, 240.23, 240.25; 382/233, 239, 251, 253; 348/394.1, 395.1, 404.1, 424.1; H04N 7/12

(56) References Cited

U.S. PATENT DOCUMENTS

| | | | | |
|---|---|---|---|---|
| 4,698,689 A | * | 10/1987 | Tzou ..................... 358/426.14 |
| 5,379,122 A | * | 1/1995 | Eschbach ................... 382/248 |
| 5,395,676 A | * | 3/1995 | Taka et al. ............... 428/32.67 |
| 5,818,531 A | * | 10/1998 | Yamaguchi et al. ..... 375/240.2 |
| 5,841,475 A | * | 11/1998 | Kurihara et al. ....... 375/240.15 |
| 5,937,101 A | * | 8/1999 | Jeon et al. .................. 382/268 |
| 6,295,376 B1 | * | 9/2001 | Nakaya ...................... 382/236 |
| 6,594,400 B1 | * | 7/2003 | Kim ........................... 382/268 |
| 2003/0058940 A1 | * | 3/2003 | Gunnewiek et al. ... 375/240.11 |

* cited by examiner

*Primary Examiner*—Nhon Diep
(74) *Attorney, Agent, or Firm*—Morgan Lewis & Bockius LLP

(57) ABSTRACT

A new dequantization scheme for DCT-based transform coding, such as JPEG, MPEG and H.26x, is disclosed. The new approach drastically reduces blocking artifacts without smoothing the decoded image. Most discrete cosine transform (DCT) based video coding suffers from blocking artifacts where boundaries of 8×8 DCT blocks become visible on decoded images. The blocking artifacts become more prominent as the bit rate is lowered. In the present invention, a new dequantization technique is disclosed for discrete cosine transform (DCT) based encoding to sharply reduce the blocking artifacts. The dequantization scheme of the present invention sharply reduces blocking artifacts in decoded images through regularization. The performance comparison with the standard JPEG as well as MPEG and H.26x decoding shows visual improvements as well as numerical improvements in terms of the peak-signal-to-noise ratio (PSNR) and the blockiness measure (BM) to be defined.

10 Claims, 6 Drawing Sheets

(a) Encoder (b) Decoder (a) Encoder (b) Decoder

US 6,853,683 B2

REGULARIZED DEQUANTIZER FOR DCT-BASED TRANSFORM CODING

BACKGROUND OF THE INVENTION

1. Technical Field

This invention relates to digital images including video. More specifically, this invention relates to a dequantizer used for decoding of digital images and video compressed by a DCT-based (discrete cosine transform) transform coding, such as JPEG, MPEG and H.26x.

2. Description of the Related Art

Emergence of Internet video as well as high definition television, not to mention the literally millions of digital images currently available on Internet, has been fueling the recent surge of interest in compression of digital images. In particular, international standards such as JPEG, MPEG and H.26x, for compression of digital images and video have received much attention due to the fact that they are open standards for any developers.

Image (and video) compression is implemented in an encoder for encoding images using a quantization matrix. The decoder then is able to decode the image, also by using a quantization matrix. In the conventional art, the enconder and the decoder use the same quantization matrix. Recently, however, algorithms have been suggested, where the encoder uses one quantization matrix and the decoder uses a different quantization matrix. The new quantization matrix, used during decoding, is computed (by the encoder) using an approach similar to Miller's least squares solution as disclosed in Miller K., "Least squares methods for ill-posed problems with a prescribed bound", SIAM J. *Math. Anal.*, vol. 1, pp. 52–74, Febuary 1970 for image restoration applications.

Another solution is disclosed in Philips W., "Correction to 'JPEG dequantization array for regularized decompression", *IEEE Trans. on Image Proc.*, vol. 6, no. 6, pp. 883–888, 1997, which offers a dequantization scheme different from the standard method.

Konstantinides, et al. propose yet another technique for computing a modified quantization matrix for image sharpening applications directly in DCT domain. See Konstantinides K. Bhaskaran V. and Beretta G., "Image sharpening in the JPEG domain", *IEEE Trans. on Image Proc.*, vol. 8, no. 6, June 1999.

However, neither approaches guarantee that the dequantization process will map the quantized DCT coefficients to its value±(quantizer spacing/2) in DCT domain. As a result, a smooth recovery is not possible, especially for compressed images at a low bit-rate.

Therefore, there is a need for a new dequantizer that can recover the original image in a smooth manner.

SUMMARY OF THE INVENTION

It is an object of the present invention to provide a dequantizer that recovers the original image in a smooth manner.

Another object of the present invention is to provide a dequantizer that guarantee mapping of quantized DCT coefficients to within±(quantizer spacing/2).

The foregoing and other objectives are accomplished by a regularized dequantizer of the present invention. An improved decoder is disclosed, which can work with the standard MPEG and H.26x compressed video as well as JPEG compressed digital images. The dequantizer of the present invention is superior over the currently specified dequantization scheme.

BRIEF DESCRIPTION OF THE DRAWINGS

FIGS. 2(*c*) and 2(*d*) for a P-frame; and FIGS. 2(*e*) and 2(*f*) for a B-frame, all obtained in two iterations.

DETAILED DESCRIPTION OF THE INVENTION

Modeling DCT-based Transform Coding

Figure 1:
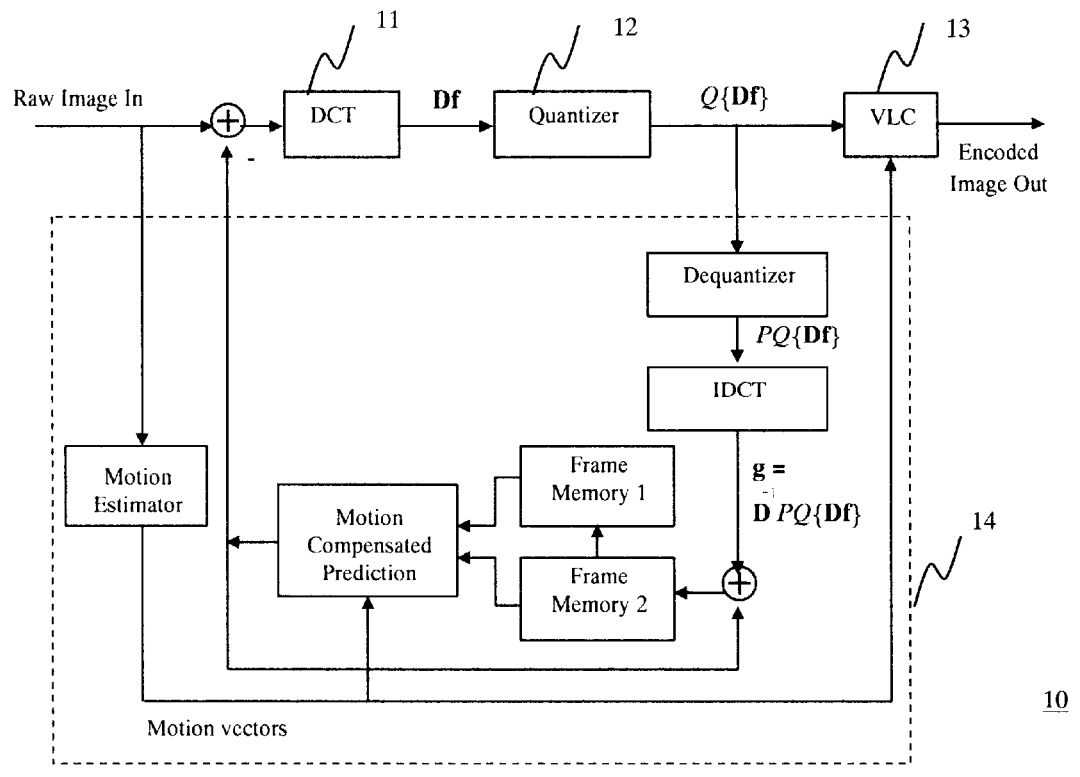
FIGS. 1(*a*) and (*b*) are block diagrams of DCT-based image encoder and decoder of the present invention, respectively.
Figure 1:
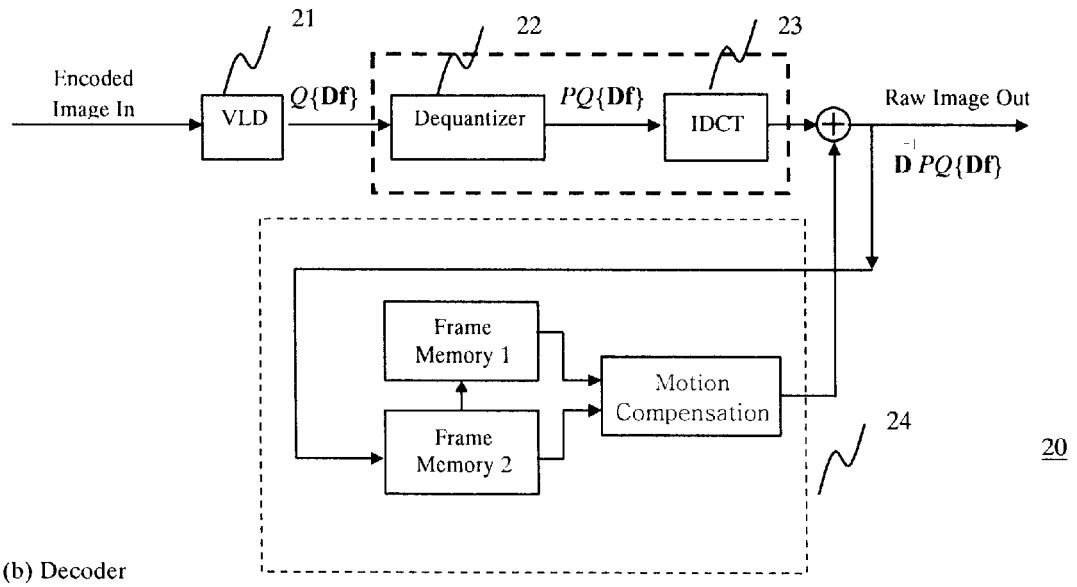

Before describing the details of the regularized dequantization of the present invention, the conventional DCT-based transform coding currently specified in the MPEG standard (as well as JPEG, H.261 and H.263) is reviewed to establish the notation.

In MPEG or other conventional DCT-based transform coding standards, the image is first divided into 8×8 blocks and the individual blocks are transformed by the discrete cosine transform (DCT). The output of this operation is denoted by Df, where f is the lexicographically ordered image and the operator D is the appropriately defined 2-D DCT matrix. The DCT coefficients are then quantized with or without a dead-zone. Since the quantization process includes a division (or a multiplication by its inverse) step by elements of the quantization matrix, the quantization operator Q can be mathematically expressed as follows:

$$Q\{Df\} = \text{round}\{M^{-1}Df - \text{sgn}(Df)\delta/2\} = M^{-1}Df - \text{sgn}\{Df\}\delta/2 + \frac{1}{2} - \text{rem}\{M^{-1}Df - \text{sgn}(Df)\delta/2 + \frac{1}{2}\} \quad (1)$$

where round{ } and rem{ } operators indicate the usual rounding and remainder operations, respectively; and sgn{ } is the signum function that maps positive, zero and negative valued reals to 1, 0 and −1, respectively. Furthermore, M is a diagonal matrix whose elements consist of appropriately ordered elements of the quantization matrix. Note that δ=1 for quantization with a dead-zone. If δ=0, Eq. (1) then represents quantization without a dead-zone. Lastly, the identity is also used:

$$\text{round}\{x\} = x + \frac{1}{2} - \text{rem}\{x + \frac{1}{2}\} \quad (2)$$

The quantized DCT coefficients are then encoded losslessly.

Upon receipt of losslessly encoded quantized DCT coefficients, the decoder first reverses the lossless encoding process to obtain quantized DCT coefficients. The lossless encoding and decoding steps together form a mathematical identity. The decoder has access to quantized DCT coefficients Q{Df} as computed by the encoder. The dequantization operation P can simply be modeled by a multiplication by M, quantization scales followed by a correction for dead-zones. That is, $$P\{Q\{Df\}\}=M(Q\{Df\}+sgn\{Df\}\delta/2)=Df+M(\frac{1}{2}-rem\{M^{-1}Df-sgn\{Df\}\delta/2+\frac{1}{2}\}) \quad (3)$$

Again, in the above, $\delta=1$ indicates quantization with a dead-zone and $\delta=0$ without a dead-zone.

The conventional decoder then takes the dequantized DCT coefficients and performs the 2-D inverse discrete cosine transform (IDCT) as follows:

$$g=D^{-1}PQ\{Df\}=f+D^{-1}M(\frac{1}{2}-rem\{M^{-1}Df-sgn(Df)\delta/2+\frac{1}{2}\}) \quad (4)$$

Note that what is desired is the original image f; however, the image as determined by the conventional decoder is g. This conventionally decoded image includes the quantization error which precisely is the second term of Eq. (4):

$$error=D^{-1}M(\frac{1}{2}rem\{M^{-1}Df-sgn(Df)\delta/2+\frac{1}{2}\}) \quad (5)$$

It is important to note that the quantization error originally introduced in the DCT domain (by the rounding operation of Eq. (1), has been re-expressed in the spatial domain. In other words, Eq. (5) is exactly the quantization error expressed in the spatial domain.

Direct interpretation of the derivation leading to Eq. (5) results in the following. The quantization error as shown in Eq. (5) above is due to the quantization Q followed by the conventional dequantization described by Eq. (3).

The present invention is based on finding a better dequantizer using regularization. Through regularization, with the assumption that the image f is smooth, a different dequantization procedure is developed.

In view of the inequality $$-\frac{1}{2}<\frac{1}{2}-rem(x+\frac{1}{2})\leq\frac{1}{2}. \quad (6)$$

The error in the DCT coefficients (just before the IDCT step) also obey $$\left|e_n'M\{1/2-rem(M^{-1}Df-sgn(Df)\delta/2+1/2)\}\right| \leq \frac{e_n^TMe_n}{2}, \quad (7)$$

for all $n$ where T indicates transpose and $e_n$ is the Euclidean basis vector with a "1" in the nth row and zeros in other rows. Although Eq. (7) appears to be cumbersome, what it states is simply that, the error introduced (in DCT domain) by the quantizer is limited between ±(quantizer spacing/2) for nth DCT coefficient. This observation allows a slightly different relationship between g and f. For this purpose, define:

$$c_{ij} = 2D - IDCT \text{ of } \left\{\begin{bmatrix} 0 & \Lambda & 0 & 0 & 0 & \Lambda & 0 \\ M & & M & M & M & & M \\ M & & 0 & 0 & 0 & & M \\ 0 & \Lambda & 0 & q_{ij} & 0 & \Lambda & 0 \\ M & & 0 & 0 & 0 & & M \\ M & & M & M & M & & M \\ 0 & \Lambda & 0 & 0 & 0 & \Lambda & 0 \end{bmatrix}\right\} \quad (8)$$

where $q_n$ is the ijth element of the quantization matrix. Furthermore, let $c_n$ be lexicographically ordered version of $c_n$. Then, $$g(k) = f(k) + \sum_{0\leq i,j\leq 1} \alpha_{ij}(k)c_{ij} \quad (9)$$

where the argument (k) indicates the extraction of the corresponding kth 8×8 block. Thus, all vectors in Eq. (9) are of the size 64×1. Furthermore, due to the inequality as shown by Eq. (7), the coefficients $\alpha_n(k)$ are restricted to lie within the interval $(-\frac{1}{2},\frac{1}{2}]$. Note that Eq. (9) is satisfied for all 8×8 blocks of the image. This is true whether or not the dead-zone is used by the quantizer.

The following observations may be made regarding the matrix $c_n$. Firstly, it is precisely the $ij^{th}$ basis vector for the inverse DCT. Secondly, it is the quantization error introduced by the $ij^{th}$ DCT coefficient represented in the spatial domain. In other words, the quantization error introduced by the $ij^{th}$ DCT coefficient manifests itself as a spatially varying error (except for the DC coefficient where it would cause a constant error within the 8×8 block) represented by $c_n$.

Regularization

In view of the previous analysis, the task is: find $\alpha_n(K)$ to minimize $\|f-g\|_2$, the $L_2$-norm, using Eq. (9). The problem as stated is an ill-posed problem, and a unique solution cannot be obtained. The remedy is to regularize the problem. By assuming that the original image $f(x,y)$ is "smooth", find $f$ that minimizes:

$$\|f-g\|_2^2 + \lambda\|\nabla f\|_2^2 \quad (10)$$

The minimizer of the functional in Eq. (10) obeys the following Euler-Lagrange Equation:

$$F_f - \frac{\partial}{\partial x}F_{f_x} - \frac{\partial}{\partial y}F_{f_y} = 0 \quad (11)$$

where $F=(f-g)^2+\lambda(f_x^2+f_y^2)$ and subscripts indicate partial differentiation the subscripting variable. Substitution of appropriate variables into the Euler-Lagrange Equation (11) results in the following Poisson Equation:

$$\nabla^2 f = \frac{1}{\lambda}(f-g) \quad (12)$$

with an appropriate boundary condition (Dirichlet or Neumann) depending on the particular application.

Image Decoding by Regularized Dequantizer

The decoded image must still be based on the received quantized DCT coefficients and thus must satisfy Eq. (9). Therefore, Eq. (12) cannot be used by itself. Because a dequantizer is desired that modifies quantized DCT coefficients by ±(quantizer spacing/2), Eq. (12) must be used together with Eq. (9).

The substitution of Eq. (9) into a lexicographically ordered version of Eq. (12) yields:

$$\sum_{0\leq i,j\leq 7} \alpha_{ij}(k)\left(Lc_{ij} - \frac{1}{\lambda}c_{ij}\right) = Lg(k) \quad (13)$$

where L is the matrix representation of the Laplacian operator for lexicographically ordered operands (i.e., vectors). Note that the original image f has been completely eliminated in Eq. (13). In fact, all terms that appear in Eq. (13) are known except for the coefficients $\alpha_{ij}(k)$. Therefore, the problem at hand is to determine $\alpha_{ij}(k)$, using Eq. (13). For this purpose, Eq. (13) may be written in matrix-vector form as follows:

$$\left[ Lc_{00} - \frac{1}{\lambda} c_{00} \mid \Lambda \mid Lc_{77} - \frac{1}{\lambda} c_{77} \right] \acute{a}(k) = Lg(k) \qquad (14)$$

where $\acute{a}(k)$ is the lexicographically ordered version of the coefficients $\alpha_{ij}(k)$. It can be shown that the system of equations above is invertible and it may be solved exactly and $\acute{a}(k)$ can be found simply by inverting Eq. (14). Certain fast FFT-like approaches may also be used. Note that Eq. (14) must be satisfied for all 8×8 blocks. Once $\acute{a}(k)$ has been determined for all blocks, the desired image can be obtained by Eq. (9) for all 8×8 blocks. However, because the coefficients $\alpha_{ij}(k)$ must be limited to lie in the interval $(-\frac{1}{2}, \frac{1}{2}]$, an iterative approach is used. In other words, if any of the computed coefficients $\alpha_{ij}(k)$ lies outside the interval $(-\frac{1}{2}, \frac{1}{2}]$, those coefficients must be clipped.

The algorithm then recomputes the coefficients based on the currently available data. The iterative decompression algorithm of the present invention implementing the regularized dequantizer is summarized below:

Initialize image with the conventionally decoded image: $f^{(o)} = g$

Initialize coefficients for all 8×8 blocks: $\alpha_{ij}(k) = 0$

Loop for m=0,1,2,3,K

Find the incremental coefficient $$\alpha_{ij}^{(m)}(k):$$

Solve Eq. (14) with $g = f^{(m)}$.

Update and clip the effective coefficient:

$$a_{ij}(k) = \min(\max(\alpha_{ij}(k) + \alpha_{ij}^{(m)}(k), -1/2), 1/2)$$

Update the current image (for all 8×8 blocks):

$$f^{(m+1)}(k) = g(k) - \sum_{0 \leq i,j \leq 7} \alpha_{ij}(k) c_{ij}$$

The end result or the decoded image, is in effect, the IDCT of the regularized dequantizer output. In practice, the coefficients $\alpha_{ij}(k)$ corresponding to low frequency components rapidly grow to values outside the interval $(-\frac{1}{2}, \frac{1}{2}]$, which is then clipped within the iteration loop. This clipping allows coefficients corresponding to higher frequency components to rise. In any case, because the final decoded image is based on Eq. (13), the present invention guarantees the updating of received DCT coefficients to within ±(quantizer spacing/2) for all DCT coefficients.

The method described above is a new dequantization scheme in comparison to other approaches described in various DCT-based coding standards, where the computed DCT coefficients are quantized according to the quantizer spacing specified by the quantization matrix elements. As an instance, on the encoder side, suppose computed DCT coefficient=41.2 quantization matrix element for this particular coefficient=8 encoded data=5 (=round {41.2/8})

Then, on the decoder side, received data=5 quantization matrix element for this particular coefficient=8 reconstructed DCT coefficient=40=5*8

Note that in this particular case, the quantization error=1.2 which is bounded to within ±(quantizer spacing/2). The method of the present invention does not simply multiply the quantizer spacing to the received data, which in this case is 40. The dequantizer of the present invention will map the received data to within the range (36, 44), where the actual value is chosen so that the final decompressed image is "smooth" in the sense of minimizing the cost functional given in Eq. (10).

Implementation

FIGS. 1(a) and (b) show block diagrams of a DCT-based image encoder and a decoder of the present invention, respectively. The present invention replaces the two modules within the dark dotted box of the decoder shown in FIG. 1(b). The encoder 10, shown in FIG. 1(a), takes the raw image, which are transformed by a DCT module 11 and quantized by a qunatizer 12. The output Q{Df} is then losslessly encoded by the variable length coder (VLC) 13 and trasnsmitted (or stored). The motion prediction, within the lightly dotted box 14, is only performed for video. For still images, the motion prediction and all connections to it can be discarded. Even for video (MPEG and H.26x) the motion prediction is performed for only P and B-frames.

The decoder 20, shown in FIG. 1(b), takes the encoded image and reverses the encoding process: variable length decoding (VLD) 21, dequantization by a regularized dequantizer 22 of the present invention followed by the IDCT module 23. As for the encoder, the motion compensation modules shown within the lightly dotted box 24 is not performed for still images and certain frames of video (I-frames of MPEG and H.26x).

Figure 2:
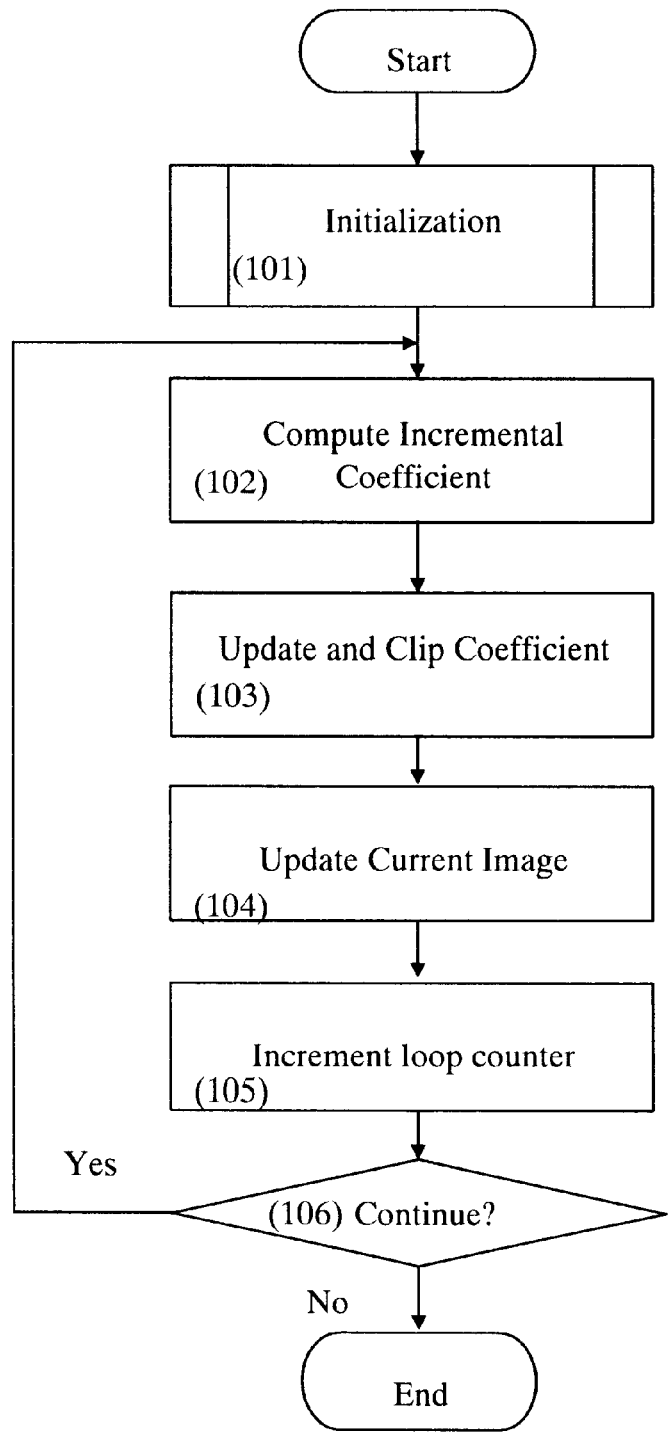
FIG. 2 is a flow chart of the software implementing the present invention.

FIG. 2 shows a flow chart of the software implementing the present invention. Step (101) initializes and sets up various parameters and arrays for operations to follows. Namely, in connection to the previously described mathematical symbols, the initialization can be summarized as:

Initialize the image buffer with the conventionally decoded image: $f^{(o)} = g$ Initialize coefficients for all 8×8 blocks: $\alpha_{ij}(k) = 0$ Initialize loop count Step (102) computes the incremental coefficient $$\alpha_{ij}^{(m)}(k)$$

for the image update. Step (103) updates and clips the effective coefficient, namely it performs the operation $$\alpha_{ij}(k) = \min(\max(\alpha_{ij}(k) + \alpha_{ij}^{(m)}(k), -1/2), 1/2).$$

Step (104) finally updates the current image buffer using the equation:

$$f^{(m+1)}(k) = g(k) - \sum_{0 \leq i,j \leq 7} \alpha_{ij}(k) c_{ij}$$

Step (105) updates the loop count and Step (106) checks the loop count to check whether to continue. When loops are no longer necessary, the processing is terminated.

Results

The performance of the regularized dequantizer of the present invention is evaluated and compared to the standard H.263+ with its standard quantization table with and without the deblocking filter. The blockiness measure (BM) defined by the following will be used to compare the two approaches.

$$BM = 10\log_{10}\left\{\frac{\sum_{vertical}\left\|\frac{\partial}{\partial x}(f-\hat{f})\right\|_2^2 + \sum_{horizontal}\left\|\frac{\partial}{\partial y}(f-\hat{f})\right\|_2^2}{N_{pix}}\right\} \quad (15)$$

where $N_{pix}$ is the total number of pixels summed. In the above, $f$ is the original image and $\hat{f}$ is the decompressed image by one of (i) MPEG, (ii) H.263+ decompression, (iii) H.263+ with its deblocking filter and (iv) the regularized dequantizer of the present invention. Note that the differences in the derivatives across the 8×8 block boundary are summed only along vertical and horizontal block boundaries. Higher BM indicates more severe blocking artifact.

Figure 3:
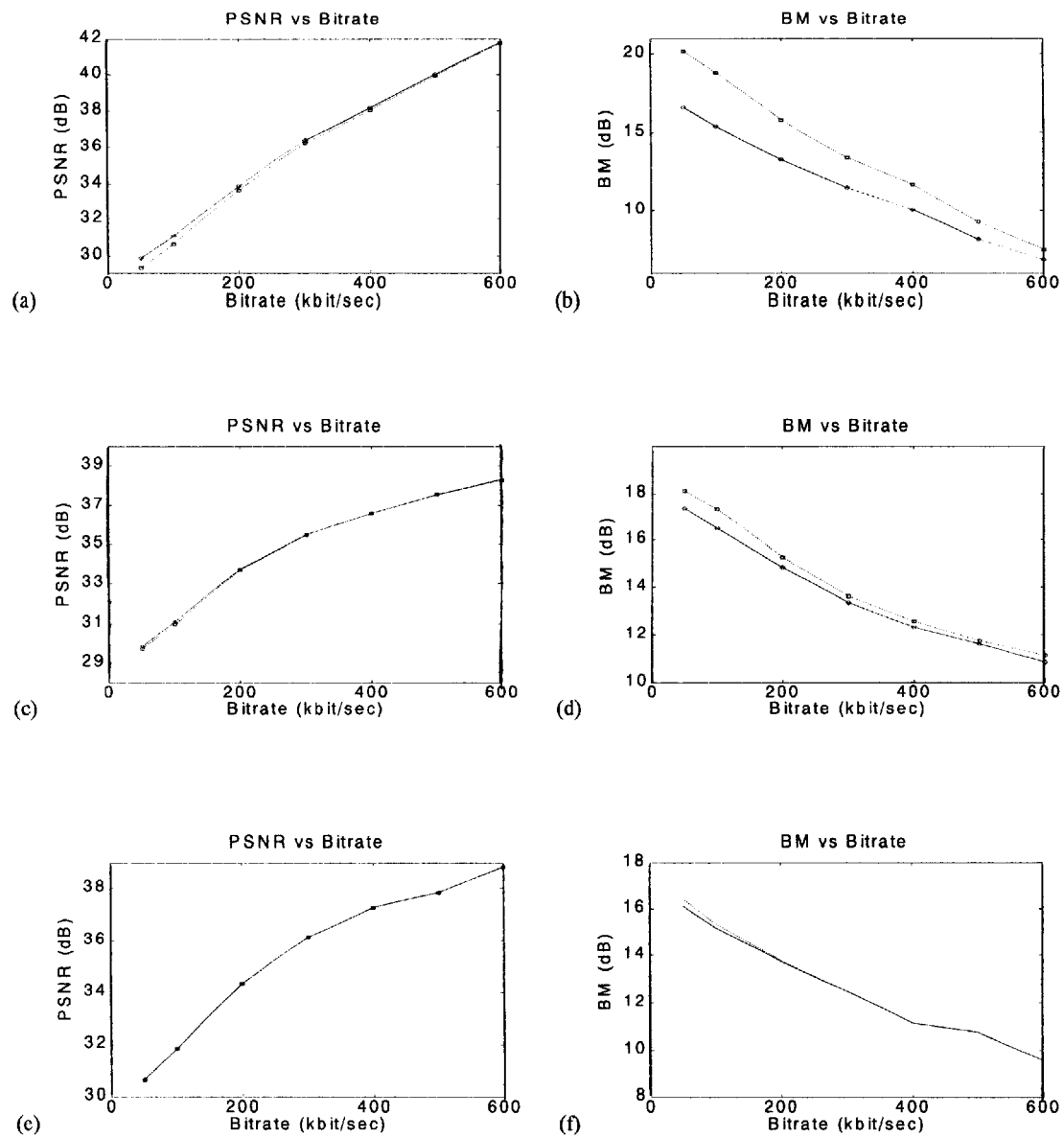
FIGS. 3(*a*), 3(*b*) are plots showing PSNR and BM values for a typical I-frame.

FIGS. 3(a) and (b) show PSNR and BM values for a typical I-frame; (c) and (d) for a P-frame; and (e) and (f) for a B-frame, all obtained in two iterations. Note that the improvement provided by the regularized dequantizer of the present invention for I frame is much greater than that of the P- and B-frames. Although improvements in actual PSNR values appear to be small (less than 1 dB for I-frame and almost negligible for B-frame) the improvements in BM values are more apparent for all frame types, especially for I-frame. In addition, a few trends can be observed from these plots. (1) The performance difference is most obvious for the I-frame and this difference is less prominent the P- and the B-frames. (2) The improvement in both the PSNR as well as BM becomes more relevant for low bit rates. (3) The improvement in the BM is greater than that of the improvement in PSNR for all frame types. (4) Higher performance gain can be expected for lower bit rate videos, however for extremely high bit rate videos, the performance gain will not be as obvious.

In addition to the numerical improvements discussed above, the visual improvement offered by the regularized dequantizer of the present invention becomes apparent upon viewing the zoomed decompressed images.

Figure 4:
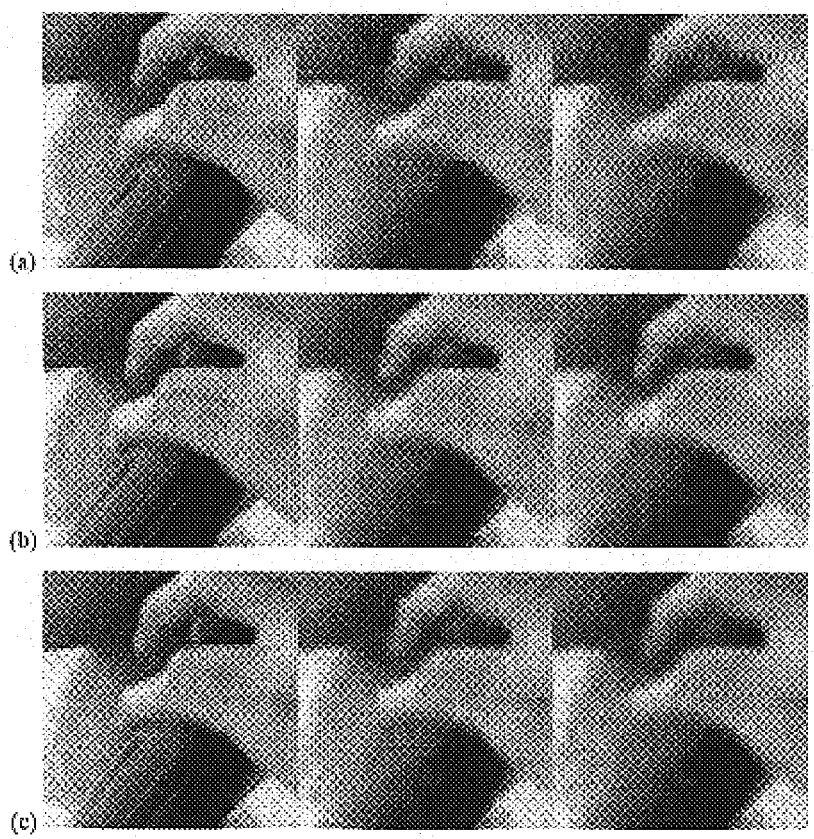
FIG. 4(*a*), 4(*b*) and 4(*c*) are an original image (left), the image as decoded by the standard MPEG (center) and the image as decoded by the dequantizer of the present invention for I-, P- and B-frames, respectively.

FIG. 4 shows the original image (left), the image as decoded by the standard MPEG (center) and the image as decoded by the dequantizer of the present invention. FIGS. 4(a), (b) and (c) show the three images for I-, P- and B-frames, respectively. All images are zoomed by a factor two. The visual improvement offered by the regularized dequantization is self-evident upon a quick comparison of these images, with the largest improvement seen for the I-frame.

The present invention is also applicable to H.26x video compression standard as the standard is also based on DCT transform coding. In particular, focus on the most recent H.263+ standard. The performance of the regularized dequantizer of the present invention is evaluated and compared to the standard H.263+ with its standard quantization table with and without the deblocking filter.

Figure 5:
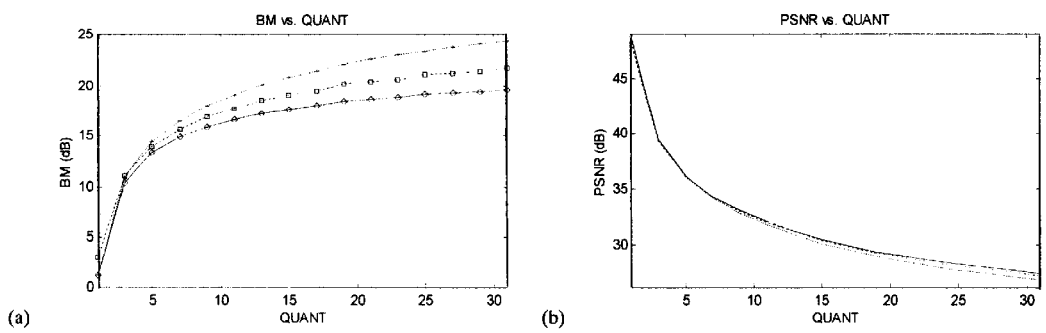
FIGS. 5(*a*) and (*b*) are plots of the PSNR and the BM values as functions of the quantization scale factor (QUANT of H.263+) using the standard Lenna image.

FIG. 5 shows plots of the PSNR (a) and the BM (b) values as functions of the quantization scale factor (QUANT of H.263+) using the standard Lenna image. The present invention consistently provides higher PSNR and lower BM values for all values of QUANT. The readily recognizable trend is that larger the quantization step size (QUANT) and thus lower the bit-rate, higher the performance gain of the regularized dequantizer over the conventional dequantizer. All images were obtained (for the regularized approach) in two iterations.

As was the case for MPEG video shown previously, although improvements in actual PSNR values appear to be small (less than 1 dB), the visual improvement offered by the regularized dequantizer of the present invention becomes apparent upon viewing the zoomed images.

Figure 6:
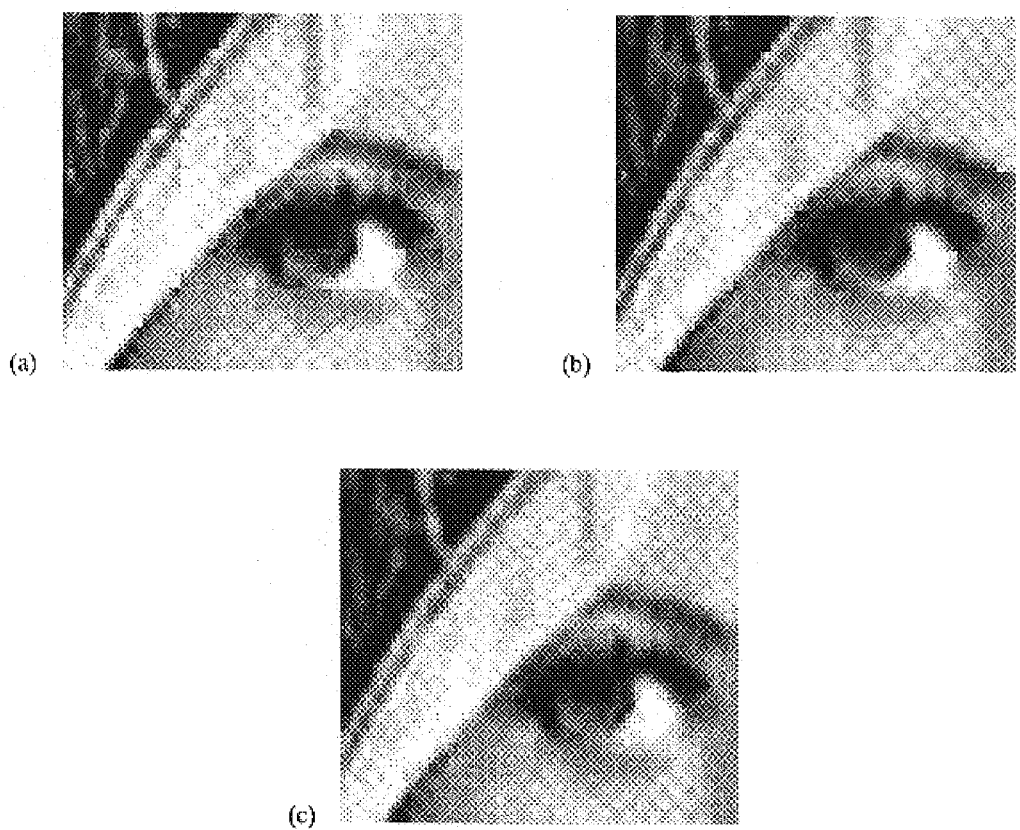
FIGS. 6(*a*), 6(*b*), and 6(*c*) are the image as decoded by H.263+, the image as decoded by the H.263+ decompression followed by the deblocking filter, the image as decoded by the decoded image by the regularized dequantizer of the present invention.

FIG. 6(a) shows the image as decoded by H.263+; FIG. 6(b) shows the H.263+ decompression followed by the deblocking filter; FIG. 6(c) shows the decoded image by the regularized dequantizer of the present invention. All images are zoomed by a factor three. Again, the visual improvement offered by the regularized dequantization is self-evident upon a quick comparison of these images.

To summarize, the present invention consistently provides higher PSNR and lower BM values for all values of the bit rate. The readily recognizable trend is that lower the bit rate, higher the performance gain achieved by the regularized dequantizer of the present invention over the conventional decompression. A new method is presented for decompressing DCT-encoded images based on the regularized dequantizer of the present invention. The superiority of the present invention has been demonstrated over the existing MPEG as well as H.263+ standard with and without its deblocking filter. As simulations have indicated, the present invention would be particularly appropriate for low-bit rate videos.

While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

What is claimed is:

1. A dequantizer for reconstructing original transform coefficients from quantized transform coefficients from an original, decompressed image, comprising:
   means for receiving the quantized transform coefficients; and
   means for reconstructing the dequantized transform coefficients from the received quantized transform coefficients by selecting transform coefficients that minimizes a cost function indicating a smoothness of the original decompressed image.

2. The dequantizer of claim 1, wherein said quantized transform coefficients are DCT transform coefficients.

3. The dequantizer of claim 2, wherein the quantized DCT coefficients are mapped to original dequantized coefficients where a quantization error is bound within ±(quantizer spacing/2).

4. A method of reconstructing original transform coefficients from quantized transform coefficients from an original, decompressed image, comprising:
   receiving the quantized transform coefficients; and
   reconstructing the dequantized transform coefficients from the received quantized transform coefficients by selecting transform coefficients that minimizes a cost function indicating a smoothness of the original decompressed image.

5. The method of claim 4, wherein said quantized transform coefficients are DCT transform coefficients.

6. The method of claim 5, wherein the quantized DCT coefficients are mapped to original dequantized coefficients where a quantization error is bound within ±(quantizer spacing/2).

7. A video decoder for decoding an encoded video containing transform coefficients representing an original video, comprising:

decoder means for decoding the encoded video to extract quantized transform coefficients;

dequantizer means for converting the quantized transform coefficients into dequantized transform coefficients; and inverse-transform means for converting the dequantized transform coefficients into the original image, wherein said dequantizer means comprises:

means for receiving the quantized transform coefficients; and means for reconstructing the dequantized transform coefficients from the quantized transform coefficients by selecting transform coefficients that minimize a cost function indicating a smoothness of the original decompressed image.

8. The video decoder of claim 7, wherein the transform coefficients are DCT transform coefficients.

9. A method of decoding an encoded video containing transform coefficients representing an original video, comprising:

decoding the encoded video to extract quantized transform coefficients;

converting the quantized transform coefficients into dequantized transform coefficients; and converting the dequantized transform coefficients into the original image, wherein converting the quantized transform coefficients into dequantized transform coefficients comprises:

receiving the quantized transform coefficients; and reconstructing the dequantized transform coefficients from the quantized transform coefficients by selecting transform coefficients that minimize a cost function indicating a smoothness of the original decompressed image.

10. The method of claim 9, wherein the transform coefficients are DCT transform coefficients.

* * * * *